United States Patent [19]
Starks

[11] Patent Number: 5,988,663
[45] Date of Patent: Nov. 23, 1999

[54] BICYCLE RIDING ASSISTANCE DEVICE

[76] Inventor: Neal A Starks, 12745 Elgin, Huntington Woods, Mich. 48070

[21] Appl. No.: 08/915,823

[22] Filed: Aug. 21, 1997

Related U.S. Application Data

[60] Provisional application No. 60/025,087, Aug. 30, 1996.

[51] Int. Cl.$^6$ .................................................. B62H 7/00
[52] U.S. Cl. ...................................... 280/293; 280/655.1
[58] Field of Search ............................... 280/293, 288.4, 280/294, 295, 296, 298, 292, 655.1, 47.371

[56] References Cited

U.S. PATENT DOCUMENTS

| | | | |
|---|---|---|---|
| 3,650,544 | 3/1972 | Cassell | 280/293 |
| 4,917,398 | 4/1990 | de Miranda Pinto | 280/293 |
| 5,154,096 | 10/1992 | Geller et al. | 74/551.8 |
| 5,259,638 | 11/1993 | Krauss et al. | 280/293 |
| 5,303,944 | 4/1994 | Kalmus | 280/288.4 |
| 5,382,040 | 1/1995 | Nanassi | 280/293 |
| 5,395,130 | 3/1995 | Rubin | 280/304 |
| 5,407,222 | 4/1995 | Harrison | 280/293 |
| 5,531,494 | 7/1996 | Singleton | 294/1.1 |
| 5,558,348 | 9/1996 | Becka | 280/282 |
| 5,564,726 | 10/1996 | Hearn et al. | 280/293 |
| 5,577,750 | 11/1996 | Sklar | 280/293 |

*Primary Examiner*—Lanna Mai
*Assistant Examiner*—Andrew J. Fischer
*Attorney, Agent, or Firm*—Howard & Howard

[57] ABSTRACT

A bicycle assistance device for assisting a young rider in learning to ride a bicycle includes a handle mounted in a mount through a quick release connection. In this way, the handle may be quickly removed from the bicycle if the assistance device is no longer being utilized. Preferably, the handle extends for a great distance when compared to the size of the mount such that when the handle is removed, the great bulk of the assistance device no longer provides a hindrance to the rider.

5 Claims, 1 Drawing Sheet

BICYCLE RIDING ASSISTANCE DEVICE

This application claims priority to U.S. Provisional Patent Application 60/025,087, filed Aug. 30, 1996.

BACKGROUND OF THE INVENTION

This invention relates to a device which allows a first person to assist a second person in learning to ride a bicycle.

In the prior art, children typically learn to ride bicycles by first utilizing training wheels. Training wheels essentially include two smaller wheels on each side of the rear wheel of the bicycle. At some point, the training wheels are removed. It is typically a challenge for the new rider to learn to ride the bicycle without training wheels.

Several devices have been proposed which allow a second person to assist the new rider in learning to ride the bicycle without training wheels. These devices could be generally described as handles of one sort or another which allow the second person to hold the bicycle as the rider rides the bicycle. The device prevents the rider from falling when initially learning to ride the bicycle without training wheels.

Typically, the handles are bolted to the bicycle. A device which is fixed to the bicycle is not as beneficial as would be desired. During the rider's learning period, it may be desirable to periodically ride the bicycle without any such assistance device on the bicycle. In fact, within a single training session, it may be desirable to sometimes use and sometimes not use the handle. The prior art devices which require the handle to bolt to the bicycle do not allow easy removal of the handle.

One proposed handle uses hook and loop type fasteners connections which could be removed. However, this device does not provide a secure connection to the bicycle.

In view of the above, it is an object of the present invention to disclose an assistance device which allows quick removal of the handle.

SUMMARY OF THE INVENTION

In a disclosed embodiment of this invention, a bicycle assistance device includes a handle which is mounted in a tubular mount through a quick release connection. Preferably, the handle includes a pin which is spring biased into an opening in the tubular mount. By depressing the pin inwardly and pulling the handle out of the tubular mount, the handle may be removed. Preferably, the tubular mount is small in length compared to the length of the handle. Thus, when the handle is removed there is little additional structure on the bicycle to hinder riding of the bicycle. In one preferred embodiment, the length of the mount compared to the overall length of the handle is less than 25%. In a most preferred embodiment, the length of the mount is less than 10% the length of the handle.

In a more preferred embodiment, the mount is fixed to a bracket attached to the rear of the bicycle. The bracket preferably includes a hole mounted on the mount bolt for the rear wheel. The bracket extends forwardly to a generally C-shaped structure which mounts on both sides of a bicycle frame member. The tubular mount is positioned between the C-shaped structure and the mount bolt such that the tubular mount is securely attached to the bicycle frame.

These and other features of the present invention can be best understood from the following specification and drawings, the following of which is brief description.

DETAILED DESCRIPTION OF A PREFERRED EMBODIMENT

Figure 1:
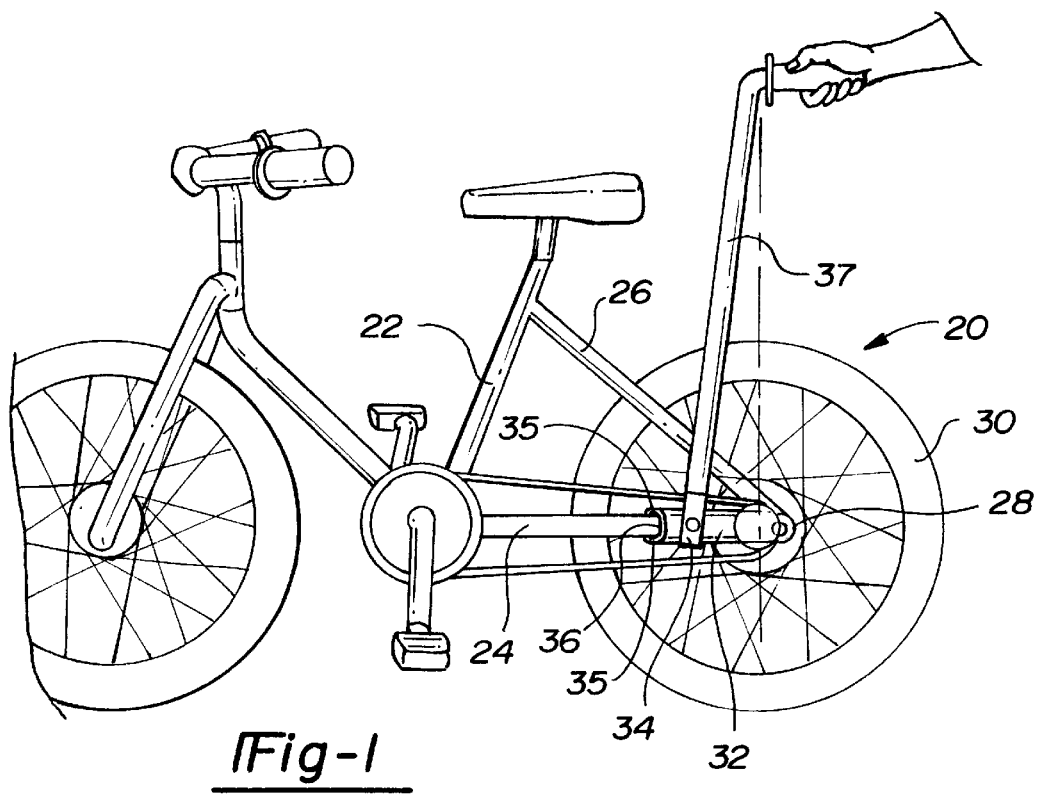
FIG. 1 is a side view of a bicycle incorporating the present invention.

FIG. 1 shows a bicycle assistance device 20 mounted on a bicycle 22. As shown, a rear bicycle frame 24 and 26 extends to a mount bolt 28 which secures the rear wheel 30 to the frame. A bracket 32 is fixed to the bolt 28 and includes a tubular mount 34. A pair of fingers 35 provide a C-shaped structure and an opening 36 received on the frame portion 24. The bracket 32 is securely mounted to the frame 24 by being secured both with the fingers 35 and the bolt 28. A handle 37 is received within mount 34. Handle 37 extends upwardly and is attached to mount 34 through a quick release connection as will be disclosed. A second user may grasp the handle and assist a bicycle rider. The handle and mount 34 are securely mounted to the bicycle frame due to the fingers 35 on one side and the mount bolt 28 on the other side.

Figures 2, 3, 5:
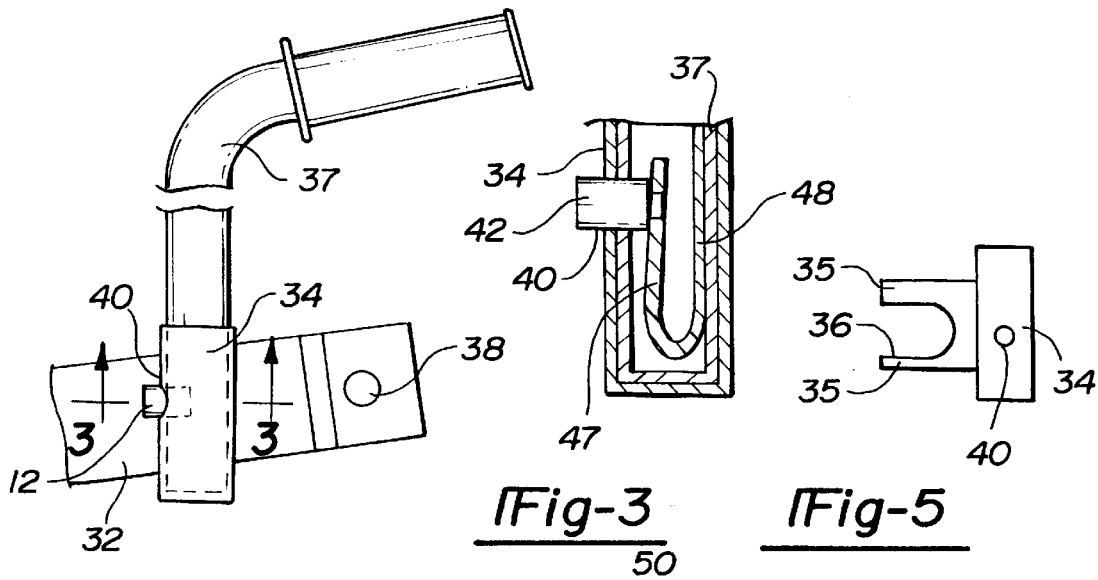
FIG. 2 is a detail of the bicycle assistance device of FIG. 1.
FIG. 3 is a cross-sectional view through a portion of the device shown in FIG. 2.
FIG. 5 is an end view of the bracket along line 5—5 as shown in FIG. 4.

As shown in FIG. 2, handle 37 is received within mount 34. An opening 40 within mount 34 receives a spring biased pin 42 from handle 37. The spring biased pin 42 allows quick release and removal of the handle from the bracket 34. The bolt hole 38 receives the axle bolt 28 from the bicycle.

As can also be appreciated from FIG. 2, mount 34 is not directly perpendicular to the central axis of the bracket 32. Rather, mount 34 is approximately at 95 degrees.

As shown in FIG. 3, the pin 42 may include a rear portion 47 abutting a spring 48. The spring 48 forces pin 42 into opening 40. Spring 48 is preferably generally U-shaped and made of spring steel. Other pin and spring mounting arrangements may be utilized. The pin 42 is biased outwardly into opening 40. When one wishes to remove handle 37, the pin 42 is easily moved against the force of the spring such that it is out of the opening 40. At that time, the handle 37 may be easily removed.

As can be appreciated from FIGS. 1, 2 and 3, the handle extends for a much greater length than mount 34. Thus, once the handle is removed, the majority of the structure of the assistance device 20 is no longer attached to the vehicle. This assists a rider in riding the bicycle without hinderance from the device when the device is not being used. In a most preferred embodiment, mount 34 extends for a length that is less than 25% of the length of the overall handle 37. In a most preferred embodiment, mount 34 extends for a length that is less than 10% of the overall length of the handle 37.

As can be appreciated from the figures, the handle 37 has its bottom extent supported within the mount 34. Further, the handle extends from the mount at an angle that is in a rearward direction when the mount is mounted to a bicycle. Finally, it can be appreciated that the handle has a mount portion received in the mount at its lower end and a handle portion at its upper end extending at an angle rearwardly from the mount portion.

Figure 4:
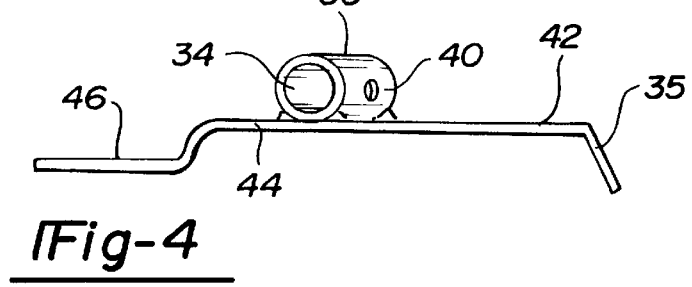
FIG. 4 is a top view of the bracket according to the present invention.

As shown in FIG. 4, the bracket 32 includes a unique structure including a portion 42 extending forwardly to fingers 35. Fingers 35 are bent inwardly at an angle between 60° and 90°, and preferably approximately 75 degrees to facilitate their mounting on the frame 24 of the bicycle. A rearwardly extending portion 34 extends rearwardly from tubular mount 34. A portion 46 is bent inwardly and includes the portion which is bolted to the bolt 28.

As also shown in FIG. 4, a second hole 50 may be placed in mount 34 to allow the handle to be alternatively mounted at a second position, spaced 90° from the FIG. 1 position, and back across the bicycle.

As shown in FIG. 5, the bracket 34 has the fingers 35 extending inwardly. Opening 36 is received on the frame 24.

Although the device is shown mounted on the left-hand side of the bicycle in FIG. 1, it should be appreciated that the device could be mounted on the right side. Moreover, various types of handles, mounts and brackets can be incorporated into the present invention.

Preferred embodiments of this invention have been disclosed, however, a worker of ordinary skill in the art would recognize that certain modifications would come within the scope of this invention. For that reason, the following claims should be studied to determine the true scope and content of this invention.

I claim:

1. A bicycle assistance device for assisting a rider in learning to ride a bicycle comprising:

a handle for being grasped by a user to assist a rider in learning to ride a bicycle;

a bracket adapted to be mounted to a bicycle, said bracket having a mount receiving said handle, a quick release connection between said handle and said mount such that said handle may be removed from said mount, said mount extending for an elongate length that is less than 25% of the length of said handle such that when said handle is removed the majority of said assistance device is no longer attached to the bicycle, said handle extending at all angle in a first direction, such that said handle extends in a first direction which is rearward when said device is mounted on a bicycle, said bracket being sized and configured such that it has a forward portion extending in a second direction from said mount, said forward portion having fingers adapted to be received both above and below a bicycle frame, and extending toward a first side of said bracket, said mount being on a second side of said bracket, said bracket including a bolt hole adapted to be fixed to a central axis of a rear wheel of a bicycle, with said bolt hole extending generally perpendicular through a plane of said bracket, and with said mount portion being spaced to one axial side of said bracket and said fingers extending from a portion of said bracket to an opposed axial side relative to said mount.

2. An assistance device as recited in claim 1, wherein said mount extends for less than 10% of the length of said handle.

3. An assistance device as recited in claim 1, wherein said bracket includes a bolt hole which is to be fixed to the central axis of the rear wheel of the bicycle.

4. An assistance device as recited in claim 1, wherein said quick release connection includes a spring biased pin received within said handle which is spring biased outwardly into an opening in said mount.

5. A bicycle assistance device as recited in claim 1, wherein said mount also extends at an angle in said first direction.

* * * * *